United States Patent
Zeller et al.

(10) Patent No.: US 11,516,696 B2
(45) Date of Patent: Nov. 29, 2022

(54) METHOD, DEVICES AND SYSTEM FOR A HYBRID BEARER SERVICE

(71) Applicant: Alcatel Lucent, Boulogne Billancourt (FR)

(72) Inventors: Dietrich Zeller, Stuttgart (DE); Hajo-Erich Bakker, Stuttgart (DE)

(73) Assignee: ALCATEL LUCENT, Nozay (FR)

( * ) Notice: Subject to any disclaimer, the term of this patent is extended or adjusted under 35 U.S.C. 154(b) by 756 days.

(21) Appl. No.: 15/760,876

(22) PCT Filed: Sep. 13, 2016

(86) PCT No.: PCT/EP2016/071577
§ 371 (c)(1),
(2) Date: Mar. 16, 2018

(87) PCT Pub. No.: WO2017/046094
PCT Pub. Date: Mar. 23, 2017

(65) Prior Publication Data
US 2018/0279159 A1   Sep. 27, 2018

(30) Foreign Application Priority Data
Sep. 16, 2015   (EP) .................................. 15306419

(51) Int. Cl.
*H04W 76/10*   (2018.01)
*H04W 28/02*   (2009.01)
(Continued)

(52) U.S. Cl.
CPC ....... *H04W 28/0257* (2013.01); *H04W 76/10* (2018.02); *H04W 76/11* (2018.02); *H04W 76/38* (2018.02); *H04W 76/12* (2018.02)

(58) Field of Classification Search
CPC ......... H04L 47/10; H04L 47/35; H04L 47/30; H04L 47/32; H04W 76/38; H04W 28/0257; H04W 76/11; H04W 76/12
See application file for complete search history.

(56) References Cited

U.S. PATENT DOCUMENTS 6,347,091 B1 *   2/2002   Wallentin .............. H04W 28/18
                                                           370/437
6,480,720 B1 *   11/2002   Coan .................... H04W 68/12
                                                           455/426.1
(Continued)

FOREIGN PATENT DOCUMENTS

| CN | 101163334 A | 4/2008 |
| CN | 103202089 A | 7/2013 |
| EP | 3 145 221 A1 | 3/2017 |

OTHER PUBLICATIONS

Bryan Sullivan et al., "OMA-CD-WRAPI-2012-0002R01 WRAPI 1.0 Push API Update," Open Mobile Alliance Ltd, XP064140421, pp. 1-9, 2012.

(Continued)

*Primary Examiner* — Hassan A Phillips
*Assistant Examiner* — Prenell P Jones
(74) *Attorney, Agent, or Firm* — Fay Sharpe LLP

(57) ABSTRACT

A method for data exchange between a user equipment and a network node over a bearer service in a communication system. A virtual access network identifier identifies a connectionless bearer service on which a network service is mapped. A logical channel identifier identifies a connection oriented bearer service on which the network service is mapped. The data is exchanged between the user equipment and the network node over the connection oriented bearer service or over the connectionless bearer service depending (Continued)

on the amount of exchanged data and/or the data bit rate and/or the expiration of a timer.

14 Claims, 7 Drawing Sheets

(51) Int. Cl.
*H04W 76/38* (2018.01)
*H04W 76/11* (2018.01)
*H04W 76/12* (2018.01)

(56) References Cited

U.S. PATENT DOCUMENTS

| | | | | |
|---|---|---|---|---|
| 6,594,238 | B1* | 7/2003 | Wallentin | H04W 28/18 370/252 |
| 6,628,617 | B1* | 9/2003 | Karol | H04L 12/66 370/230.1 |
| 6,714,532 | B1* | 3/2004 | Kawaguchi | H04L 12/5692 370/351 |
| 7,230,937 | B2* | 6/2007 | Chi | H04W 28/24 370/329 |
| 7,821,983 | B2* | 10/2010 | Wang | H04W 72/0486 370/328 |
| 8,913,494 | B1* | 12/2014 | Marupaduga | H04L 47/525 370/230 |
| 8,914,463 | B2* | 12/2014 | Angle | H04L 67/16 709/217 |
| 9,426,700 | B2* | 8/2016 | Hahn | H04W 36/0055 |
| 9,832,672 | B2* | 11/2017 | Mochizuki | H04W 28/08 |
| 10,075,888 | B2* | 9/2018 | Hampel | H04W 36/14 |
| 10,194,448 | B2* | 1/2019 | Bindrim | H04L 65/1013 |
| RE47,487 | E* | 7/2019 | Angle | H04W 4/21 |
| 10,820,355 | B2* | 10/2020 | Hui | H04W 74/0833 |
| 2001/0055286 | A1* | 12/2001 | Lin | H04W 72/121 370/329 |
| 2003/0074453 | A1* | 4/2003 | Ikonen | H04L 67/101 709/228 |
| 2004/0095945 | A1* | 5/2004 | Woog | H04W 8/12 370/329 |
| 2004/0165581 | A1* | 8/2004 | Oogushi | H04L 12/2859 370/352 |
| 2005/0169279 | A1* | 8/2005 | Magd | H04L 12/4608 370/395.5 |
| 2006/0239265 | A1* | 10/2006 | Son | H04L 12/189 370/390 |
| 2007/0258422 | A1* | 11/2007 | Herrmann | H04W 28/12 370/338 |
| 2008/0049621 | A1* | 2/2008 | McGuire | H04L 12/4645 370/236.2 |
| 2009/0172119 | A1* | 7/2009 | Eriksson | H04L 69/165 709/206 |
| 2009/0291703 | A1* | 11/2009 | Wang | H04W 8/186 455/518 |
| 2009/0316581 | A1* | 12/2009 | Kashyap | H04L 47/12 370/236 |
| 2010/0008292 | A1* | 1/2010 | Ludwig | H04L 45/302 370/328 |
| 2012/0069750 | A1 | 3/2012 | Xing et al. | |
| 2012/0239626 | A1* | 9/2012 | Aysan | H04L 45/30 707/674 |
| 2012/0257527 | A1* | 10/2012 | Jorgensen | H04L 69/165 370/252 |
| 2013/0159021 | A1* | 6/2013 | Felsher | G06Q 30/0283 705/3 |
| 2013/0301611 | A1* | 11/2013 | Baghel | H04W 72/04 370/331 |
| 2014/0219230 | A1* | 8/2014 | Schierl | H04W 72/08 370/329 |
| 2015/0016347 | A1 | 1/2015 | Barclay et al. | |
| 2015/0092554 | A1* | 4/2015 | Mochizuki | H04W 88/06 370/235 |
| 2015/0206124 | A1* | 7/2015 | Aubin | G06Q 20/40 705/44 |
| 2015/0350912 | A1* | 12/2015 | Head | H04L 61/2007 726/4 |
| 2016/0066363 | A1* | 3/2016 | Zhang | H04W 72/08 370/315 |
| 2016/0080969 | A1* | 3/2016 | Tseng | H04W 4/70 370/329 |
| 2016/0198021 | A1* | 7/2016 | Mooney | H04L 69/165 370/467 |
| 2017/0013640 | A1* | 1/2017 | Loehr | H04W 76/14 |
| 2017/0265227 | A1* | 9/2017 | Wang | H04W 72/04 |
| 2017/0374696 | A1 | 12/2017 | Doll et al. | |
| 2018/0014309 | A1* | 1/2018 | Schierl | H04W 72/08 |
| 2018/0077722 | A1* | 3/2018 | Awad | H04W 72/0446 |
| 2018/0255499 | A1* | 9/2018 | Loehr | H04B 7/2606 |
| 2019/0268882 | A1* | 8/2019 | Baghel | H04W 12/001 |
| 2020/0068547 | A1* | 2/2020 | Li | H04W 76/18 |

OTHER PUBLICATIONS

"3rd Generation Partnership Project; Technical Specification Group Services and System Aspect; Study on Machine-Type Communications (MTC) and other mobile data Applications communications enhancements (Release 12)," 3GPP TR 23.887 V12.0.0, pp. 1-151, (Dec. 2013).

"3rd Generation Partnership Project; Technical Specification Group Radio Access Network; LTE Radio Access Network (RAN) enhancements for diverse data applications (Release 11)," 3GPP TR 36.822 V11.0.0, pp. 1-49, (Sep. 2012).

"3rd Generation Partnership Project; Technical Specification Group Services and System Aspects; General Packet Radio Service (GPRS) enhancements for Evolved Universal Terrestrial Radio Access Network (E-UTRAN) access (Release 13)," 3GPP TS 23.401 V13.3.0, pp. 1-324, (Jun. 2015).

International Search Report for PCT/EP2016/071577 dated Dec. 1, 2016.

"3rd Generation Partnership Project; Technical Specification Group Services and System Aspect; Machine-Type and other Mobile Data Applications Communications Enhancements (Release 12)," 3GPP TR 23.887 V1.0.0, pp. 1-133, (Jun. 2013).

* cited by examiner

METHOD, DEVICES AND SYSTEM FOR A HYBRID BEARER SERVICE

TECHNICAL FIELD

This application is directed, in general, to wireless cellular networks and, more specifically, to systems, apparatus and methods for a hybrid bearer service in wireless cellular networks.

BACKGROUND

In future wireless networks e.g. those of the fifth generation (5G), where Machine to Machine communication (M2M) will be a common scenario, use cases of small data transmission or short transaction based communication will be frequent. Reduction of signalling overhead will be important in connection with small data packets as the signalling overhead will be significant compared to the overall data sent on the network. Thus, reduction of signalling overhead for bearer setup and release will be one key element to achieve network efficiency when small, sporadic data packets will be sent, e.g. in M2M communication scenarios. Also, other communication scenarios based on 5G wireless networks will require ultra low latency communication with negligible setup delays.

Current (4G and earlier) mobile broadband networks provide their bearer services in a connection oriented way. This approach is highly efficient for traffic patterns as found for voice communication, high speed internet access and video distribution. All these applications show traffic patterns of long enduring sessions in which packets are continuously exchanged between the communication partners. These exchanges can be referred to as session oriented transmissions. However for applications as found e.g. in the area of Machine Type Communication (MTC), more frequently mentioned as M2M, the traffic patterns are characterized by short transaction oriented (i.e. request by terminal response by server) communication patterns. This type of communication is called Small Data Transmission (SDT). A definition of SDT can be found in e.g. the 3GPP Technical Specification 3GPP TS23.887. For SDT the signaling overhead to establish the bearer connections is prohibitive (in terms of signaling load and communication overhead and delay) and not compensated by the savings possible by communicating data over connection oriented bearers.

There are certain use cases whose data traffic patterns which can be a mixture of both traffic patterns. During long periods of time only the SDT pattern prevails being sometimes interrupted by sessions of more intensive data communication adhering to the session oriented transmission pattern. Examples for this kind of use cases and applications are push notification oriented Web applications like instant messaging applications as WhatsApp. In this kind of applications there is a mix of notifications being transmitted and received by keep alive maintained TCP connections, small text messages being exchanged, often accompanied by photo/video transmission). For those applications it would be desirable that the service is provided depending on the actual application communication traffic demands by the appropriate bearer service i.e. connectionless for the SDT traffic times and connection-oriented for the session oriented traffic times.

In 4G wireless networks which use connection-oriented bearer services, a NodeB may use an "inactivity timer" which is typically set to 10 seconds as one way to determine how long a terminal is kept in connected state without actual data transmission before it is put to Idle state. A full cycle from Idle to Connected and then back to Idle causes considerable signaling load (e.g. around 40 messages exchanged). This makes each single SDT costly as it is in general accompanied by the signaling. In these cases the signalling load in the networks may exceed the load caused by the user data itself. In addition, the connection oriented nature of the bearer services incurs necessarily a connection setup delay (approximately more than 50 ms), which exceeds the requirements of 5G to support real-time applications with response times lower than 10 ms. On the other hand connectionless service needs higher packet overhead and also does not allow for guaranteed resource reservation and therefore connectionless is less suited for high volume data sessions. Until now there are solutions which use only connection oriented bearer services for optimizing the signaling overhead in accordance to the traffic pattern. In one of these solutions specially adapted timers are used to control the transitions between the RRC-Connected and the RRC-Idle states. Such a solution is described in 3GPP TR 36.822. This solution is not suitable to provide the high savings provided by connectionless bearer services.

In another solution the bearer management is performed in such a way that additional dedicated bearers for specific services or traffic flows are set up. This solution does not provide sufficient benefits as the mapping on the different bearers is only done by means of Traffic Flow Templates and therefore not dependent on the current traffic pattern.

SUMMARY

It is an object of the present invention to obviate the above disadvantages and provide an advantageous bearer service in a communication system which allows an efficient support of applications in 5G communication networks.

According to one embodiment of the invention, a method for data exchange between a user equipment and a network node over a bearer service in a communication system is proposed. A virtual access network identifier identifies a connectionless bearer service on which a network service is mapped. Further a logical channel identifier identifies a connection oriented bearer service on which the network service is mapped. The data is exchanged between the user equipment and the network node over the connection oriented bearer service or over the connectionless bearer service. This depends on the amount of exchanged data and/or on the data bit rate and/or the expiration of a timer. This may also depend on other parameters.

According to another embodiment of the invention, a user equipment for data exchange with a network node over a bearer service in a communication system is proposed. A virtual access network identifier identifies a connectionless bearer service on which a network service is mapped. A logical channel identifier identifies a connection oriented bearer service on which the network service is mapped. The user equipment comprises a memory unit which is adapted to store mapping information of the virtual access network identifier with the connectionless bearer service and also of the logical channel identifier with the connection oriented bearer service. The user equipment also comprises an interface which is adapted to exchange data with the network node over the connection oriented bearer service or over the connectionless bearer service depending on the amount of exchanged data and/or the data bit rate and/or the expiration of a timer.

According to yet another embodiment of the invention, a network node for data exchange with a user equipment over a bearer service in a communication system is proposed. A virtual access network identifier identifies a connectionless bearer service on which a network service is mapped. A logical channel identifier identifies a connection oriented bearer service on which said network service is mapped. The network node comprises a memory unit which is adapted to store a mapping information of the virtual access network identifier with the connectionless bearer service and also of the logical channel identifier with the connection oriented bearer service. The network node also comprises an interface which is adapted to exchange data with the network node over the connection oriented bearer service or over the connectionless bearer service depending on the amount of exchanged data and/or the data bit rate and/or the expiration of a timer.

According to a final embodiment of the invention, a communication system comprising a user equipment and a network node adapted to exchange data with each other over a bearer service is proposed. A virtual access network identifier identifies a connectionless bearer service on which a network service is mapped. A logical channel identifier identifies a connection oriented bearer service on which the network service is mapped. The user equipment and the network node are both adapted to exchange data with each other over the connection oriented bearer service or over the connectionless bearer service depending on the amount of exchanged data and/or the data bit rate and/or the expiration of a timer.

Further advantageous features of the embodiments of the invention are defined and are described in the following detailed description.

BRIEF DESCRIPTION OF THE DRAWINGS

Reference is made to the following description taken in conjunction with the accompanying drawings, in which.

DETAILED DESCRIPTION

Embodiments of methods, devices and systems are described herein for the efficient support of application in 5G wireless networks exhibiting mixed communication traffic patterns.

Figure 1:
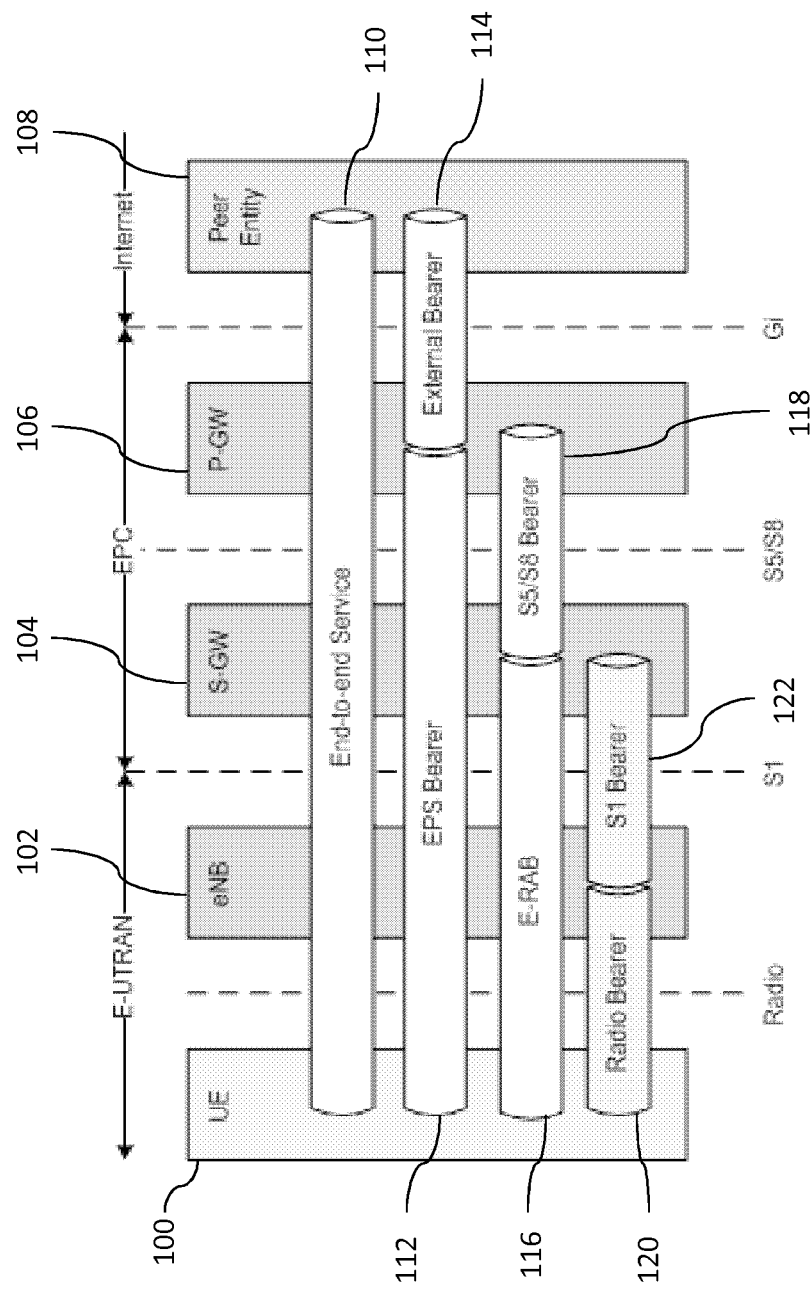
FIG. 1 shows a schematic view of a connection oriented bearer service.

FIG. 1 shows a schematic view of a connection oriented bearer service. An end-to-end connection between a User Equipment 100 and an external network 108 is depicted as end-to-end bearer 110. It is provided by an Evolved Packet Switched System bearer (EPS-bearer) 112 and an external bearer 114 providing connection to an external network 108, e.g. the Internet. An EPS-bearer uniquely identifies traffic flows that receive a common Quality of Service (QoS) treatment between a User Equipment 100 and a Packet Data Network Gateway (P-GW) 106. The EPS-Bearer 112 is a virtual connection between the User Equipment 100 and the Packet Data Network Gateway 106, which identifies data sent and received between these two end points with specific QoS attributes, e.g QCI, GBR, Allocation Retention Priority. The Evolved UTRAN Radio Access Bearer (e-RAB) 116 transports the packet of an EPS-Bearer 112 between the User Equipment 100 and the Serving Gateway (S-GW) 104. The S5/S8 Bearer 118 transports the packets of an EPS bearer 112 between the Serving Gateway 104 and the Packet Data Network Gateway 106. The Radio Bearer 120 transports packets of an E-RAB 116 between the User Equipment 100 and the eNodeB 102. An S1 Bearer 122 transports the packets of an E-RAB 116 between the eNodeB 102 and the Serving Gateway 104. Packet exchange between the User Equipment 100 and the external network 108 are assigned to one or more EPS-Bearers 112 by means of Traffic Flow Templates (TFT) Defining Service Data Flows (SDF). The Radio Bearer 120, S1 Bearer 122 and S5/S8 Bearer 118 are bound together by switching tables. The switching tables thus provide a connection oriented connection.

Figure 2:
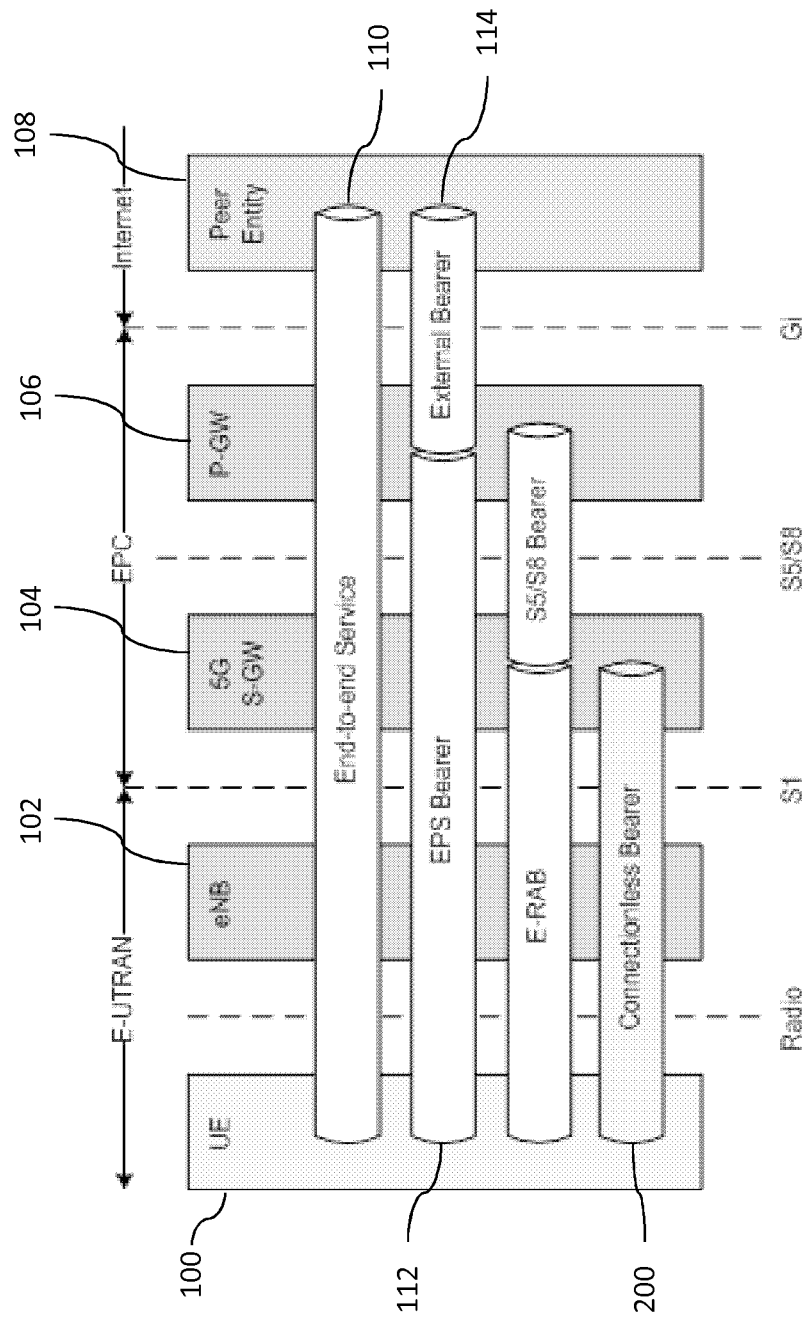
FIG. 2 shows a schematic view of a connectionless bearer service.

FIG. 2 shows a schematic view of a connectionless bearer service. An end-to-end connection between a User Equipment 100 and sink in the external network 108 is depicted as end-to-end bearer 110. It is provided by an Evolved Packet switched System bearer (EPS-bearer) 112 and an external bearer 114 providing connection to an external network 108, e.g. the Internet. An EPS-bearer 112 uniquely identifies traffic flows that receive a common Quality of Service (QoS) treatment between a User Equipment 100 and a Packet Data Network Gateway 106. The above correspond to the connection oriented bearer service as described with regard to FIG. 1. Further, in FIG. 2 a connectionless bearer 200 is illustrated which is based on a connectionless tunnel protocol. According to the connectionless tunnel protocol, data packets are forwarded from the User Equipment 100 to the Packet Data Network Gateway 106. From there, the data packets are forwarded to the external network, e.g. the Internet.

Figure 3:
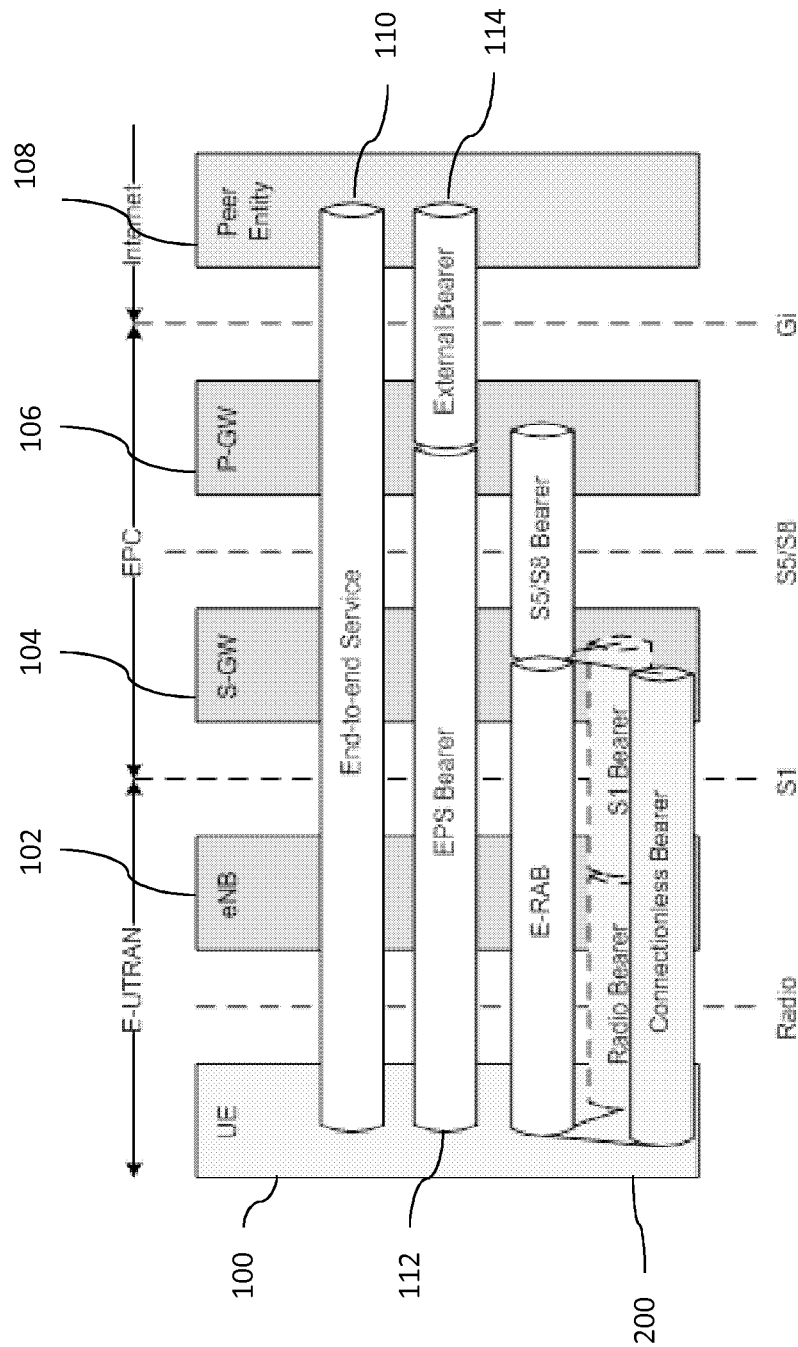
FIG. 3 shows a schematic view of a so called hybrid bearer service.

FIG. 3 shows a schematic view of a so called hybrid bearer service. An EPS Bearer transports data packets complying to specific uplink and downlink Traffic Flow Templates (TFTs). The identified packet flows (based on the TFTs) need to be mapped on bearers. This is achieved by the network providing the UE and the network node terminating the connectionless bearer (e.g. the S-GW) with mapping information i.e. to which underlying bearer an overlaying bearer is mapped. In order for the dynamic mapping on either a Connectionless Bearer or a Connection Oriented Bearer made up by the Data Radio Bearer (DRB) and the S1 Bearer to be realized, the network provides the UE with an identity (ID) of the virtual access network representing the connectionless bearer on which the bearer service is mapped. This mapping is permanent regardless if the signaling connection state is RRC/ECM-IDLE or RRC/ECM-CONNECTED until the network changes or withdraws the mapping.

If a UE (also referred to as terminal or user equipment) enters the RRC-CONNECTED state for the purpose of transporting the EPS-Bearer on a connection oriented bearer, the network provides the UE with the Logical Channel ID corresponding to the Data Radio Bearer it has set up for the connection oriented service. The mappings can be implemented by mapping tables and can be stored for example in a memory unit in the user equipment. Such a mapping could like as the one below.

| Mapping between EPS Bearer and underlying bearer services in UE | | |
| --- | --- | --- |
| EPS Bearer ID corresponding to a TFT (values: EPS-Bearer ID) | Connection Oriented Radio Bearer identified by logical channel id (values: the LCID or none) | Connectionless Bearer identified by virtual access network id (values: vACC-ID) |
| e.g. 5 e.g. 8 | e.g. 3 | e.g. 101 |

In an embodiment, the UE may trigger the switching between using connectionless and connection oriented bearers. The UE is configured with rules or policies determining when the UE should request the setup of connection oriented bearer(s) and then to map the traffic on the newly setup bearers. The request to setup a connection oriented bearer is preferably implemented in accordance with current standards in the form of a NAS "Service Request" procedure as described in e.g. 3GPP TS 23.401. This procedure is analogous to what is done in the connection oriented bearer only case, with the only exception that the trigger condition is different.

In the case of coexistence of several EPS bearers, at times when a connection oriented radio bearer service is used over a radio link then preferably all EPS bearers over this link are transported in a connection oriented way. This does not exclude that for bearer services which can only be provided by the new connectionless bearer services (e.g. D2D, terminal to infrastructure, in-access computing, cloud based services etc) it may still be that the EPS bearers are transported by connectionless bearer services.

If a connection oriented bearer has been setup, is can be released according to a predefined rule or policy. A first alternative would be that the network requests the UE to release the connection after it detects low or no traffic activity (e.g. based on a timer). The other alternative could be that the UE requests the release based on predefined rules.

Figure 4:
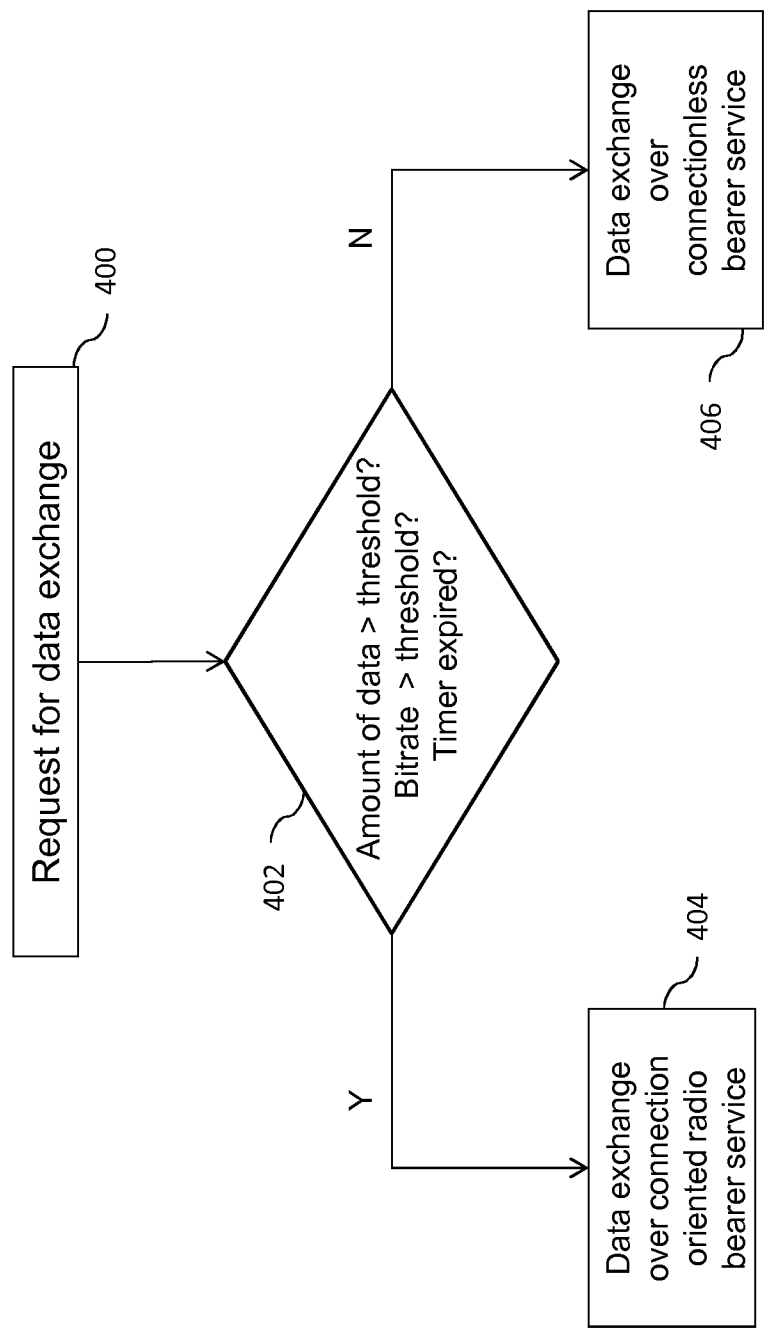
FIG. 4 shows a flow diagram of the basic method for data exchange according to the invention.

FIG. 4 shows a flow diagram of the basic method for data exchange according to the invention. In step 400 there is a request for data exchange. This request may be initiated, for example by the user equipment 100 or the communication network. As already mentioned there has been already a bearer mapping performed and the UE has the mapping information. In step 402 there are a number of checks performed which determine if the data exchange is performed over a connection oriented or a connectionless bearer. These checks can be defined by rules or policies which could reflect a network operator's radio resource management and service provisioning policy. Therefore they are provided to the UE by a proper radio access network node terminating radio resource signaling. These rules or policies might define a check of a maximum number of bytes per defined time (i.e. bitrate) against a predefined threshold or of the total amount of data for the bearer within the buffer of the user equipment against another predefined threshold. The thresholds for evaluating these criteria can be set by the network operator as described above. Furthermore, a timer may be used to define the establishment of data exchange. For example a network operator's policy may determine that upon expiration of a timer the data exchange should be performed over a connectionless bearer service. The expiration of the timer could signify for example a time period of inactivity between the UE and the network.

The UE itself could also have the ability to decide the bearer for the data exchange e.g. based on battery saving algorithms. Other criteria might be the type of network service that requires the data exchange, a subscription of a user of the user equipment or an actual overall load in the network or cell where the UE is camping.

After these checks are performed in step 402 and based on their result the data exchanged is performed over a connection oriented bearer service in step 404 or over a connectionless bearer service in step 406. The symbols Y for Yes and N for No shown in FIG. 4 are mainly serving for descriptive purposes as they represent the general concept and not the actual result of any of the checks described above.

The switching between connection oriented and connectionless bearer service is performed dynamically following the procedure described above. The UE is required to comprise functions and/or other means to switch the data flows between the different bearers in accordance to the rules described above or on command by the network. This does not mean that a connection oriented or a connectionless bearer could not remain persistently established if deemed advantageous by the network or the network operator. This switching of bearer service between a connection oriented and a connectionless can be referred to as a hybrid bearer service.

The network node terminating the hybrid bearer service needs to maintain, in a similar way as the UE, a dynamic mapping of the EPS bearer service onto either a connectionless or a connection oriented bearer service. In an example where a S-GW 104 terminates at least one hybrid bearer for a UE, the S-GW maintains a table mapping EPS-bearers on a connectionless bearer service. This is implemented by means of a dynamic mapping table which could look like the one below.

| Mapping between EPS Bearer and underlying bearer services in Network node | | |
| --- | --- | --- |
| EPS Bearer ID corresponding to TFT or S5/S8 bearer (values: EPS-Bearer ID Or S5/S8 F-TEID UL and DL) | Connection Oriented S1 Bearer (values: pair of UL and DL F-TEID or None) | Connectionless Bearer identified by virtual access network id (values: vACC-ID, or vACC-ID + BS) |
| e.g. 5 | e.g. [1067; 3027 IP@BS] | e.g. 101 |

The difference to the mapping table used for the UE shown above lies in that in order to specify the connection oriented bearer over S1 the fully qualified tunnel endpoint IDs (F-TEID) have to be used rather than logical channel IDs (LCID). For the connectionless case the difference lies in that in addition to the virtual access network ID, also addressing or switching information pointing to the serving base station has to be maintained, if available.

In an embodiment, in case that for the virtual access network ID no proper addressing or switching information is available and data packets towards a UE are arriving then a broadcasting towards all base stations needs to be applied.

In the case where the network triggers a transition between a connectionless and a connection oriented bearer service, in addition to the procedure described above for the case of the UE also the network node terminating the hybrid bearer could be configured with rules/policies. For example the downlink traffic activity could trigger the establishment of a certain bearer service.

Figure 5:
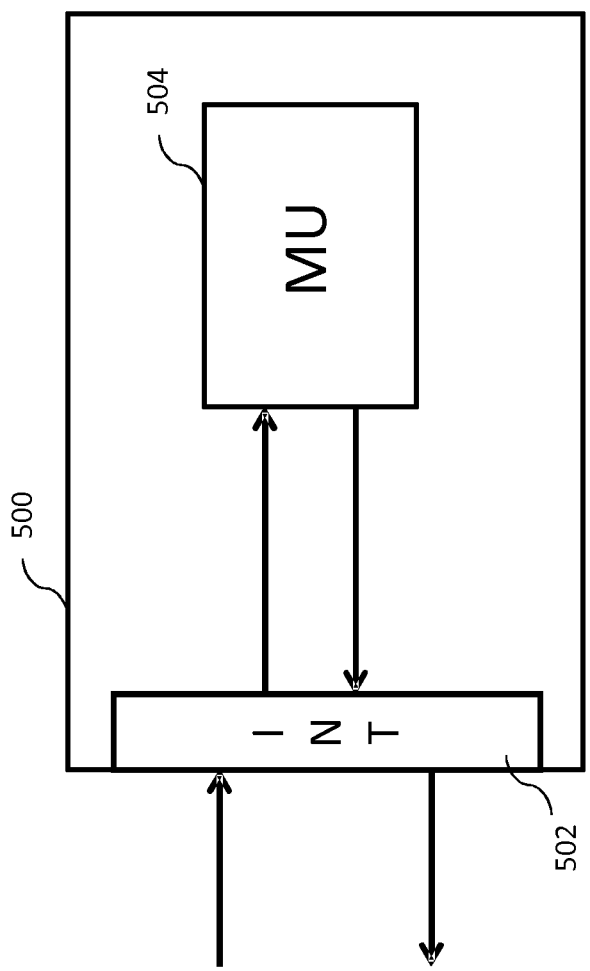
FIG. 5 shows a user equipment for data exchange with a network node over a bearer service in a communication system.

FIG. 5 shows a user equipment (UE) 500 for data exchange with a network node over a bearer service in a communication system. The UE 500 comprises a memory unit (MU) 504. Within the MU 504 mapping information of the virtual access network identifier with the connectionless bearer service and of the logical channel identifier with the connection oriented bearer service is stored. This information is given to the UE 500 by the network and may be dynamically updated. This way the MU and thus the UE may constantly have the latest and most relevant mapping information. The UE 500 also comprises an interface (INT) 502 which is adapted to exchange data with the network node over the connection oriented bearer service or over the connectionless bearer service. The INT 502 can receive the mapping information from the MU 504 and depending on the amount of exchanged data or the data bit rate or the expiration of a timer direct the data exchange over the connection oriented bearer service or over the connectionless bearer service. In an embodiment, the mapping information can be sent to the MU 504 over the INT 502. The information on the amount of data exchanged, the data bit rate and the timer may be given to the INT 502 of the UE 500 by the network.

Figure 6:
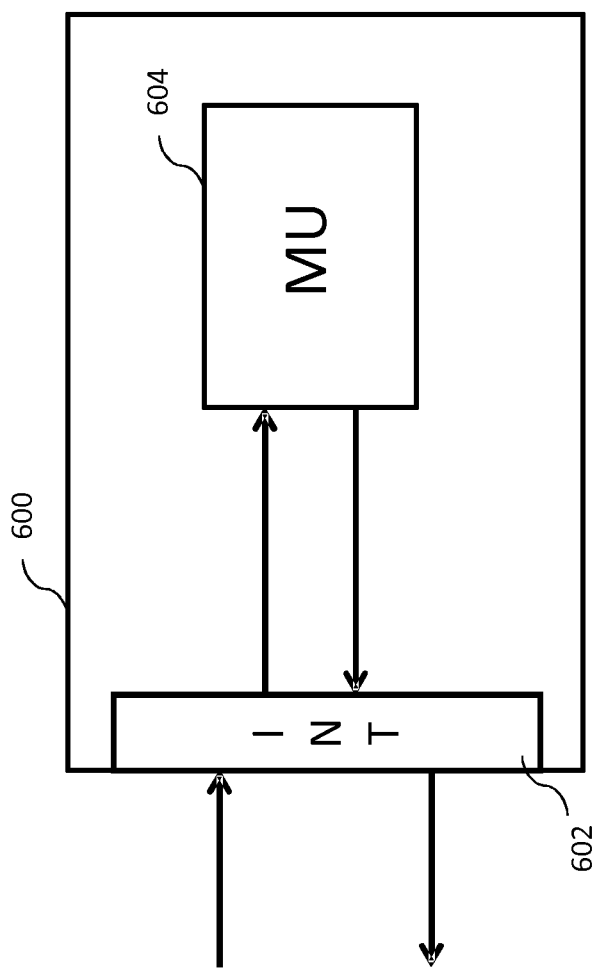
FIG. 6 shows a network node for data exchange with a user equipment over a bearer service in a communication system.

FIG. 6 shows a network node 600 for data exchange with a user equipment 500 over a bearer service in a communication system. The network node 600 comprises a memory unit (MU) 604 which is maintains mapping information of the virtual access network identifier with the connectionless bearer service and of the logical channel identifier with the connection oriented bearer service. This information is given to the network node 600 by the network and may be dynamically updated. This way the MU 604 and thus the network node may constantly have the latest and most relevant bearer mapping information. The network node also comprises an interface (INT) 602 which is adapted to exchange data with the UE 500 over the connection oriented bearer service or over the connectionless bearer service. The INT 602 can check the mapping information from the MU 604 and depending on the amount of exchanged data or the data bit rate or the expiration of a timer direct the data exchange over the connection oriented bearer service or over the connectionless bearer service. The information on the amount of data exchanged, the data bit rate and the timer may be given to the INT 602 of the network node 600 by the network.

Figure 7:
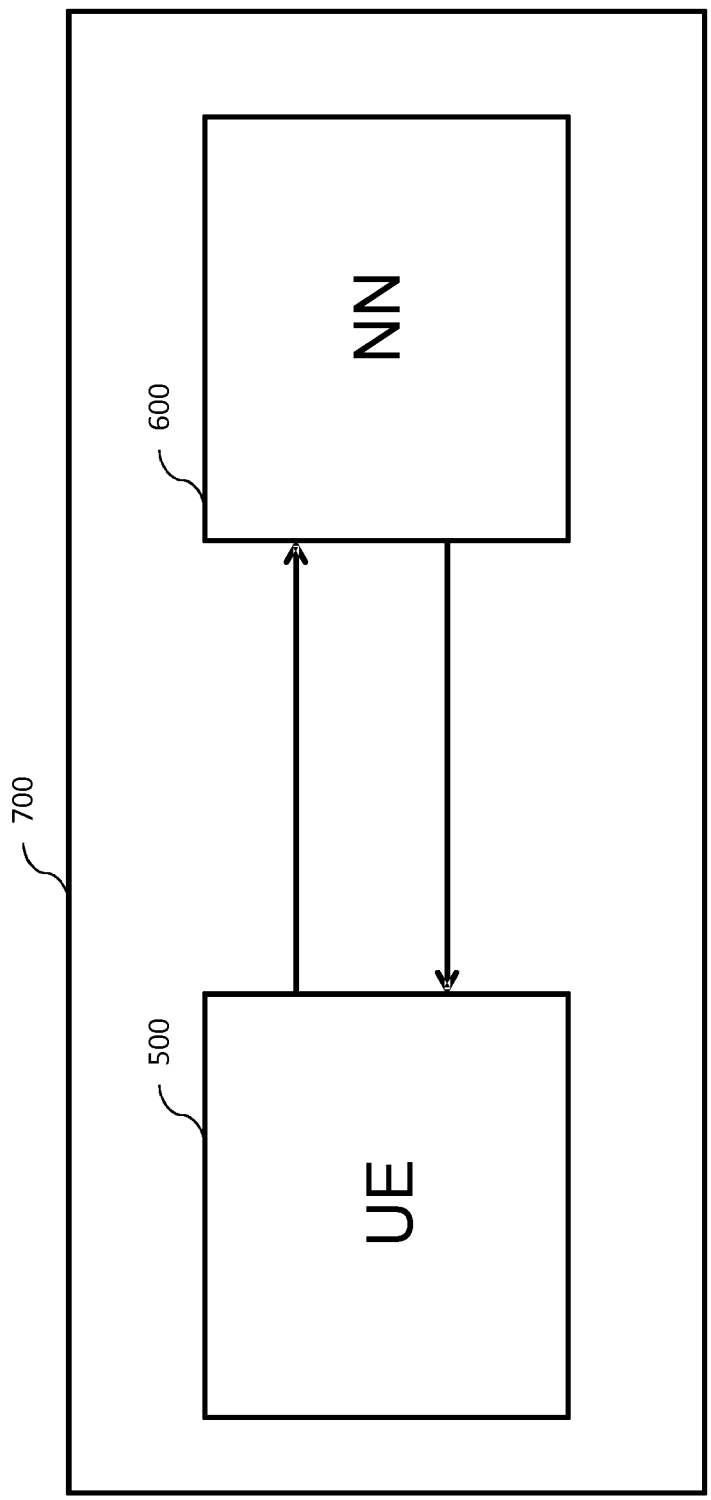
FIG. 7 shows a communication system for data exchange over a bearer service.

FIG. 7 shows a communication system 700 comprising a user equipment 500 and a network node 600. Both the user equipment 500 and the network node 600 are adapted to exchange data with each other over a bearer service. They exchange data with each other over a connection oriented bearer service or over a connectionless bearer service depending on the amount of the exchanged data or the data bit rate or the expiration of a timer.

The application of the solution described by this invention allows an efficient support of applications in 5G communication networks exhibiting mixed communication traffic patterns of small data transmission and Session Oriented Transmissions by alternately transporting the related data traffic over connection oriented and connectionless bearer services.

The above description and the accompanying figures merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended to aid the reader in understanding the principles of the invention and the concepts contributed by the inventors to furthering the art. They are thus to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A method for data exchange comprising mixed communication traffic patterns of transaction oriented transmissions using small data transmissions and session oriented transmissions between a user equipment and a network node over a bearer service in a communication system, wherein a virtual access network identifier identifies a connectionless bearer service on which a network service is mapped and wherein a logical channel identifier identifies a connection oriented bearer service on which said network service is mapped, the method comprising data being exchanged between the user equipment and the network node over a selected one of said connection oriented bearer service for the session oriented transmissions or said connectionless bearer service for the transaction oriented transmissions using small data transmissions, the selection being based on at least one of an amount of exchanged data, a data bit rate and an expiration of a timer, wherein if the amount of exchanged data exceeds a threshold then the data is exchanged between the user equipment and the network node over said connection oriented bearer service, and wherein if the data bit rate of the exchanged data exceeds a threshold then the data is exchanged between the user equipment and the network node over said connection oriented bearer service.

2. The method according to claim 1 wherein the selection to exchange data between the user equipment and the network node over the connection oriented bearer service or over the connectionless bearer service is based further on a type of a network service.

3. The method according to claim 2 wherein the network service is an Internet service.

4. The method according to claim 2 wherein the network service is a small data transmission service.

5. The method according to claim 1 wherein the selection to exchange data between the user equipment and the network node over the connection oriented bearer service or over the connectionless bearer service is based further on a total traffic load of the communication system.

6. The method according to claim 1 wherein the selection to exchange data between the user equipment and the network node over the connection oriented bearer service or over the connectionless bearer service is based further on a mobile subscription of a user of the user equipment.

7. The method according to claim 1 wherein the selection to exchange data between the user equipment and the network node over the connection oriented bearer service or over the connectionless bearer service is based further on a network operator's service provisioning policy.

8. The method according to claim 1 wherein if data is being exchanged between the user equipment and the network node over the connection oriented bearer service and low or no data traffic activity is detected the selection is made to exchange the data over the connectionless bearer service.

9. A user equipment comprising:
at least one processor;
at least one data memory; and
at least one program memory including computer program code, the at least one program memory and the computer program code configured to, with the at least one processor, cause the user equipment to perform data exchange comprising mixed communication traffic patterns of transaction oriented transmissions using small data transmissions and session oriented transmissions with a network node over a bearer service in a communication system wherein a virtual access network identifier identifies a connectionless bearer service on which a network service is mapped and wherein a logical channel identifier identifies a connection oriented bearer service on which said network service is mapped; and to store, in the at least one data memory, mapping information of the virtual access network identifier with the connectionless bearer service and of the logical channel identifier with the connection oriented bearer service, said user equipment further comprising an interface adapted to exchange data with the network node over a selected one of said connection oriented bearer service for the session oriented transmissions or said connectionless bearer service for the transaction oriented transmissions using small data transmissions, the selection being based on at least one of an amount of exchanged data, a data bit rate and an expiration of a timer, wherein the user equipment is adapted to exchange the data over said connection oriented bearer service if the amount or the data bit rate of exchanged data exceeds a threshold.

10. A network node equipment comprising:
at least one processor;
at least one data memory; and
at least one program memory including computer program code, the at least one program memory and the computer program code configured to, with the at least one processor, cause the network node to perform data exchange comprising mixed communication traffic patterns of transaction oriented transmissions using small data transmissions and session oriented transmissions with a user equipment over a bearer service in a communication system wherein a virtual access network identifier identifies a connectionless bearer service on which a network service is mapped and wherein a logical channel identifier identifies a connection oriented bearer service on which said network service is mapped and to store, in the at least one data memory, mapping information of the virtual access network identifier with the connectionless bearer service and of the logical channel identifier with the connection oriented bearer service, said network node further comprising an interface adapted to exchange data with the network node over a selected one of said connection oriented bearer service for the session oriented transmissions or said connectionless bearer service for the transaction oriented transmissions using small data transmissions, the selection being based on at least one of an amount of exchanged data, a data bit rate and an expiration of a timer, wherein the network node is adapted to exchange the data over said connection oriented bearer service if the amount or the data bit rate of exchanged data exceeds a threshold.

11. A communication system comprising a user equipment and a network node adapted to exchange data with each other over a bearer service using mixed communication traffic patterns of transaction oriented transmissions using small data transmissions and session oriented transmissions, wherein a virtual access network identifier identifies a connectionless bearer service on which a network service is mapped and wherein a logical channel identifier identifies a connection oriented bearer service on which said network service is mapped, said user equipment and network node being adapted to exchange data with each other over a selected one of said connection oriented bearer service for the session oriented transmissions or said connectionless bearer service for the transaction oriented transmissions using small data transmissions, the selection being based on at least one of an amount of exchanged data, a data bit rate and an expiration of a timer, wherein the communication system is adapted to exchange the data over said connection oriented bearer service if the amount or the data bit rate of exchanged data exceeds a threshold.

12. The user equipment of claim 9 wherein the selection to exchange data between the user equipment and the network node over the connection oriented bearer service or over the connectionless bearer service is based further on a type of network service, a total traffic load of the communication system, a mobile subscription of a user of the user equipment or a network operator's service provisioning policy.

13. The network node of claim 10 wherein the selection to exchange data between the user equipment and the network node over the connection oriented bearer service or over the connectionless bearer service is based further on a type of network service, a total traffic load of the communication system, a mobile subscription of a user of the user equipment or a network operator's service provisioning policy.

14. The communication system of claim 11 wherein the selection to exchange data is exchanged between the user equipment and the network node over the connection oriented bearer service or over the connectionless bearer service is based further on a type of network service, a total traffic load of the communication system, a mobile subscription of a user of the user equipment or a network operator's service provisioning policy.

* * * * *